(12) United States Patent
Konvalinka

(10) Patent No.: US 9,189,612 B2
(45) Date of Patent: Nov. 17, 2015

(54) BIOMETRIC VERIFICATION WITH IMPROVED PRIVACY AND NETWORK PERFORMANCE IN CLIENT-SERVER NETWORKS

(71) Applicant: Ira Konvalinka, Toronto (CA)

(72) Inventor: Ira Konvalinka, Toronto (CA)

( * ) Notice: Subject to any disclaimer, the term of this patent is extended or adjusted under 35 U.S.C. 154(b) by 0 days.

(21) Appl. No.: 14/276,738

(22) Filed: May 13, 2014

(65) Prior Publication Data

US 2014/0337635 A1    Nov. 13, 2014

Related U.S. Application Data

(60) Provisional application No. 61/822,484, filed on May 13, 2013.

(51) Int. Cl.
| | |
|---|---|
| *G06F 21/00* | (2013.01) |
| *G06F 21/32* | (2013.01) |
| *H04L 29/06* | (2006.01) |
| *H04L 29/08* | (2006.01) |

(52) U.S. Cl.
CPC ............ *G06F 21/32* (2013.01); *H04L 63/0861* (2013.01); *H04L 67/04* (2013.01); *H04L 63/045* (2013.01); *H04L 63/166* (2013.01)

(58) Field of Classification Search
CPC ........................... G06F 21/32; H04L 63/0861
USPC .......................................................... 713/186
See application file for complete search history.

(56) References Cited

U.S. PATENT DOCUMENTS

| | | | | |
|---|---|---|---|---|
| 6,819,219 | B1 * | 11/2004 | Bolle et al. ................... | 340/5.52 |
| 7,711,152 | B1 * | 5/2010 | Davida et al. ................. | 382/115 |
| 2003/0115490 | A1 * | 6/2003 | Russo et al. .................. | 713/202 |
| 2006/0170530 | A1 * | 8/2006 | Nwosu et al. ................ | 340/5.53 |
| 2009/0310830 | A1 | 12/2009 | Bolle | |
| 2010/0083000 | A1 | 4/2010 | Kesanupalli | |
| 2010/0138667 | A1 * | 6/2010 | Adams et al. ................. | 713/186 |
| 2011/0126024 | A1 | 5/2011 | Beatson | |
| 2011/0302420 | A1 * | 12/2011 | Davida .......................... | 713/180 |
| 2013/0254533 | A1 * | 9/2013 | Welch et al. .................. | 713/155 |
| 2014/0282945 | A1 * | 9/2014 | Smith et al. ....................... | 726/6 |

OTHER PUBLICATIONS

"External Memory Protection Mechanism based on Encryption Using Revocable Hardwired Key", 1st IEEE Global Conf. on Consumer Elect., Tokyo, JP, Oct. 2-5, 2012, pp. 670-671 (See ESR).

(Continued)

*Primary Examiner* — Amare F Tabor

(57) ABSTRACT

The present invention relates to improving the privacy of biometric information used in biometric authentication of identity by retaining all biometric information corresponding to a given user, and conducting all transactions related thereto (i.e., the actual authentication process) on a client (i.e., user) side of the system, thereby maximizing the user's control over biometric information corresponding to himself and preventing the storage of biometric templates on third-party servers outside of the control of the concerned individual. In a particular example of the present invention, security for the biometric information is further enhanced by encrypting the biometric template (used as a comparison reference during authentication, as is known) stored on the client side and completely destroying an original unencrypted version of the template. Also specified is secure storage of encryption keys for encrypting biometric data at the client. In yet a further example of the present invention, authentication is preferably conducted using the encrypted biometric templates.

11 Claims, 4 Drawing Sheets

(56) References Cited

OTHER PUBLICATIONS

"High Confidence Visual Recognition of Persons by a Test of Statistical Independence" Daughman, J.G., IEEE Trans. Patt. Analysis and Mach. Intell., vol. 15, No. 11, Nov. 1993.

"Cryptographically Secure Biometrics" by Stoianov, A., Proc. SPIE 7667, Biometric Technology for Human Identification VII, 76670C (Apr. 14, 2010).

TCG [Trusted Computing Group] Specification, Architecture Overview Specification, Revision 1.4, Aug. 2, 2007.

"Data at Your Fingertips," Informational circular of the Gov't of Canada, publication date unknown, retrieved from Internet at least as of May 13, 2013.

European Search Report for EP 14168049.6.

* cited by examiner

BIOMETRIC VERIFICATION WITH IMPROVED PRIVACY AND NETWORK PERFORMANCE IN CLIENT-SERVER NETWORKS

FIELD OF THE INVENTION

The present invention generally relates to biometrics, and more particularly relates to identity authentication in client-server communication networks using biometric information.

BACKGROUND OF THE INVENTION

Biometrics relates to measuring and analyzing features of the human body such as fingerprints, retina vein patterns, irises, voice patterns, facial structure, and hand/finger measurements for either authentication (i.e., one-to-one verification—"Am I who I claim I am?"), or identification (i.e., one-from-many identification—"Who am I?") purposes.

A particular use of biometric authentication is to provide a more secure identity authentication, compared with, for example, access badges (which can be lost or stolen) or pass codes (which can be used by someone other than the authorized individual).

Generally, biometric systems include capture devices to acquire biometric information, software algorithms for effective authentication/identification, and databases that store reference biometric data for comparison.

Biometric data is generated first by a step of enrollment in which a biometric characteristic, such as a fingerprint, is captured by an appropriate sensor, such as a fingerprint scanner. The captured information is then mathematically transformed into a numerical model called a reference template. The mathematical transformation is conventional in the art, specified in, for example, American National Standard for Information Technology—"Finger Minutiae Format for Data Interchange": ANSI INCITS 378-2004 and its revisions. Thereafter, one or more reference templates are stored in a conventional computer database as data files. The reference templates are sometimes known in the art as "gallery" templates. For the sake of simplicity in the present application, they will be referred to herein simply as reference templates.

For authentication (i.e., proof of identity), an individual presents his biometric characteristic by way of an appropriate detector or reader, such as a fingerprint scanner, palm scanner, retinal scanner, or a camera (for taking a facial image, for example). The detected biometric characteristic is then mathematically transformed into an input template (sometimes known in the art as a "probe" template) using the same transformation for creating the reference template, thereby creating an input template that can be compared with a respective stored reference template to confirm or reject the identity of the individual. The process of identification is similar, but the input template instead is compared against a plurality of stored reference templates to try to find a match.

To date, secure biometric authentication systems are based on client-server network arrangements, such as the conventional arrangement shown in FIG. 1.

With reference to FIG. 1, the biometric reference templates 110 are stored on or operably associated with (such as by way of a conventional database) one or more servers 100 remote from the individuals to whom the templates correspond. The user U (on the client side) has a smart device 102, such as a smart phone or computer, which includes an integrated biometric reader, such as a fingerprint scanner. The user U authenticates his identity by swiping the appropriate fingertip 104 across the scanner so that the fingerprint is read. The smart device 102 then transmits an authentication request 106 (including encrypted information corresponding to the fingerprint scan) via a communication network 108 to the remote server 100 where the corresponding reference template 110 is operably stored. A comparison between the fingerprint scan, converted into an input template, and the relevant reference template is made on the server side, and an authentication success/failure response 112 is returned to the client side via the network 108.

However, this conventional arrangement has some important disadvantages with respect to data privacy and network performance.

Ultimately, biometric information is personal information about an identifiable individual. As the use of biometric authentication increases, the manner in which the information is used and retained raises privacy concerns. Indeed, retention of biometric templates on third-party servers outside of the control of the concerned individual raises the possibility of, for example, tracking that individual's location and activity without the individual being aware, particularly if there is not a high degree of trust between the individual and the third party controlling the server.

In addition to the privacy issues mentioned above, the conventional arrangement of FIG. 1 generates a high data transmission load because of the large amount of traffic, usually consisting of large-sized transmissions of encrypted biometric data, directed to the remote server (where the reference biometric templates are stored). The arrangement of FIG. 1 is also not very scalable as a function of the number of client-side users.

SUMMARY OF THE INVENTION

The present invention is therefore directed to a system and method of biometric authentication that uses local (i.e., client-side) storage and manipulation of reference and input biometric templates, instead of storing, particularly, the reference templates at a remote third-party server. However, the templates are processed so as to further assure security of the authentication process.

BRIEF DESCRIPTION OF THE DRAWINGS

The present invention will be even more clearly understood with reference to the drawings appended hereto, in which.

DETAILED DESCRIPTION OF THE PRESENT INVENTION

In the description of the present invention set forth herein, the reference to a "smart device" is meant to be a generic reference to any electronic user-side device that may provide an interface to a biometric authentication process. This can include, by way of example and without limitation, smart phones (such as iPhone®, Blackberry®, Galaxy®, etc.), tablet computing devices (Nook®, iPad®, etc.), laptop computers, desktop computers, dedicated biometric readers, and so on. In accordance with the present invention, the smart device is operably associated with a biometric reader which may or may not be integral with the smart device.

Furthermore, the description of the present invention hereinbelow references fingerprints (and correspondingly, fingerprint scanners as the biometric reader) solely by way of example and for economy of description. It should be specifically understood that the present invention is meant to apply to any known (constant size) biometric representation that can be captured by an appropriate electronic biometric reader, such as, without limitation, retinal vein patterns, facial structure, iris patterns, voice recognition, and palm prints.

Figure 2:
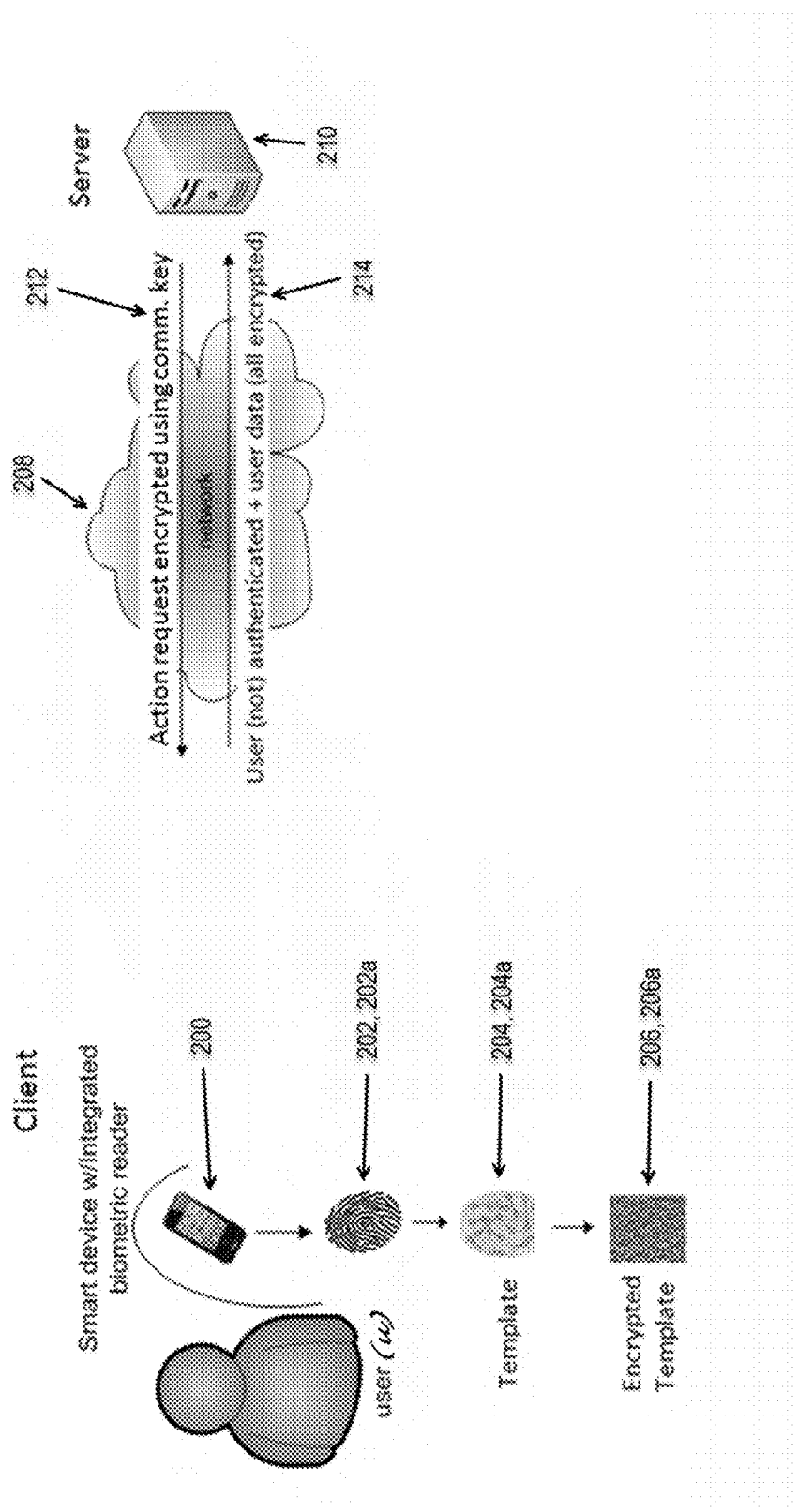
FIG. 2 schematically illustrates a biometric authentication system according to the present invention.

FIG. 2 illustrates an example system in accordance with the present invention.

Figure 1:
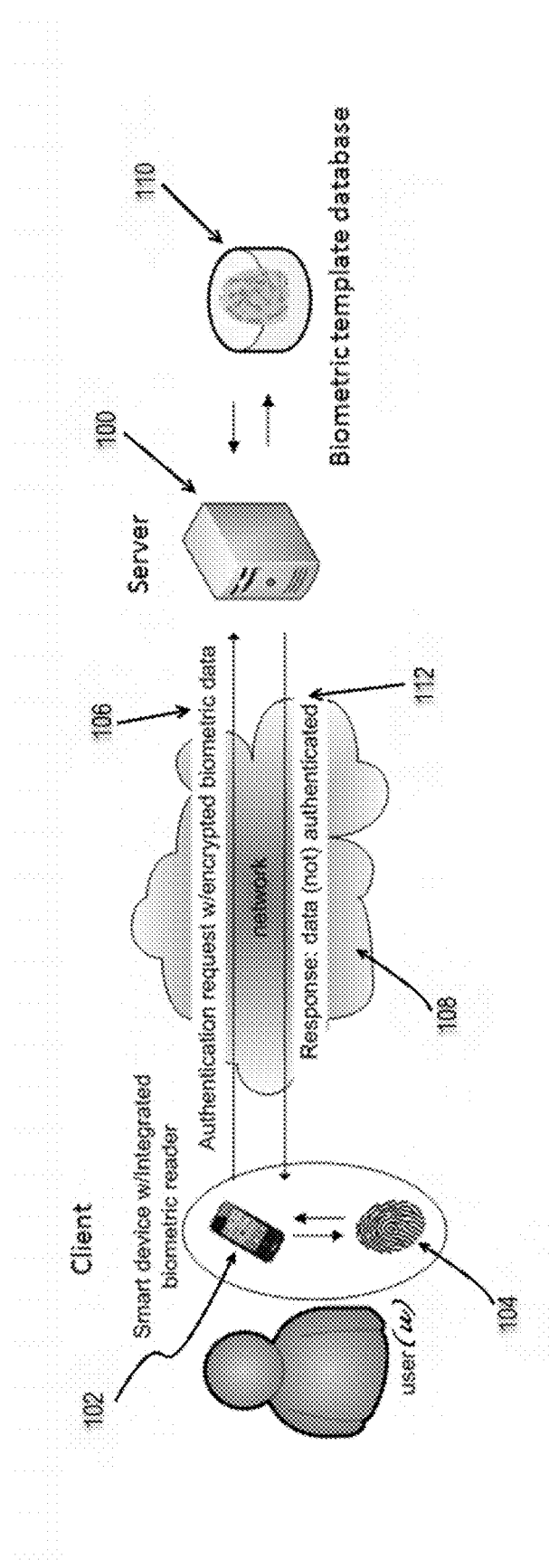
FIG. 1 schematically illustrates a conventional client-server system for biometric authentication, where biometric templates are stored at a remote server.

Differently from the system of FIG. 1, the biometric template (for example, corresponding to a fingerprint scan) is stored on the client side in the user's smart device that includes a biometric reader, such as, for example, an integrated fingerprint scanner. Thus, unlike the conventional system of FIG. 1, biometric information (both the reference templates and the biometric scans (and the resultant input templates) to be authenticated) is maintained on the client (i.e., user's) side only, and not transferred across the network or to a remote server. The privacy of the information is therefore enhanced.

In use, biometric information is initially read for the purpose of creating the biometric template. For example, the smart device may have an integrated fingerprint scanner. The user can therefore scan a fingerprint, and that fingerprint is used to create, after mathematical transformation in a known manner, an input template.

In the present invention, the template is required to be immediately encrypted before being stored on the smart device, and the unencrypted "plain" version of the template is immediately destroyed. The server side entity cannot decrypt or otherwise access the encrypted template. Any potential intruder could not access encryption keys used, because special attention is paid to keep the encryption keys safe in internal memory. First, according to the present invention, the cryptographic key must not be obtainable even using physical methods or even by an authenticated user. Second, if possible cryptographic key leakage is identified, the smart device preferably provides permanent key destruction capability, without possibility of recovery. Either one of the two existing methods specified next could be applied for that task. One method is Physical Unclonable Function ("PUF") key generation implemented along with a revocable hardwired key mechanism. See, for example, K. Y. Park, Y. S. Kim, and J. Kim, "External Memory Protection Mechanism based on Encryption using Revocable Hardwired Key", The 1st IEEE Global Conference on Consumer Electronics 2012, pp. 670-671 (fully incorporated herein by reference). The use of PUF keys is interesting here because it generally requires very little hardware to implement, therefore making it suitable for portable smart devices. PUF key generation is described by G. E. Suh et al. in "Aegis: A Single-Chip Secure Processor", IEEE Design & Test of Computers, vol. 24, no. 6, pp. 570-580, November 2007, which document is fully incorporated herein by reference.

Another approach for keeping the biometric template encryption keys secure uses secure hardware implementations similar to the Trusted Platform Module conforming to the specification created by the Trusted Computing Group. See, for example, TCG Specification, Architecture Overview Specification, Revision 1.4, 2 Aug. 2007.

It should be noted that biometric authentication using encrypted data has been conventionally considered difficult because of a natural incompatibility between variations between biometric samples on the one hand, and the data precision usually required in encryption on the other hand. However, new technical algorithms have become available that accurately permit using an encrypted biometric template in biometric authentication, or, in other words, secure biometric authentication in the encrypted domain (as specified in the present invention).

In general, algorithms for secure biometric authentication in the encrypted domain requires that the biometric representation in question be "XOR based" (as is discussed, for example, with respect to mathematical modeling of iris patterns in "High Confidence Visual Recognition of Persons by a Test of Statistical Independence" by Daughman, J. G., IEEE Trans. Pattern Analysis and Machine Intelligence, vol. 15, no. 11, pp. 1148-1161, November 1993, which document is fully incorporated herein by reference). See, also, "Cryptographically Secure Biometrics" by Stoianov, A., Proc. SPIE 7667, Biometric Technology for Human Identification VII, 76670C (Apr. 14, 2010), which document is also fully incorporated by reference. For fingerprints, an approach for transforming standard minutiae representations into fixed-length XOR binary feature vectors is disclosed in published U.S. patent application Ser. No. 2009/0310830 published on Dec. 17, 2009 (now U.S. Pat. No. 8,249,314, issued on Aug. 21, 2012), which document is fully incorporated herein by reference. (According to preliminary research led by the present inventor, binary vector length can be reduced from a recommended $2^{24}$ to a more acceptable $2^{21}$.)

In one example, the arrangement of FIG. 2 can be used as part of a log in process for accessing a secured computer system, such as in a bank (for example, as part of a remote banking service), via a smart device, such as a smart phone. Obviously, reference to a bank and the use of a smart phone, as such, is solely by way of illustration, and the present invention as described here can be extended to other secure systems and access devices.

According to the present invention, the user's biometric reference (or gallery) template (generated in a known manner) corresponding to his fingerprint 202 (for example) is generated in a known manner, and then stored in encrypted form 206 on his smart device 200 (using, for example, a Revocable Hardwired Encryption Key ("RHEK")). This is sometimes referred to as "enrollment" See, also, step 1 in FIG. 4. Notably, the generation of the reference (or gallery) template is preferably performed offline and is not part of the client-server communication session. Furthermore, the initially scanned, unencrypted, fingerprint scan 202, and corresponding, unencrypted, input template 204, are deleted forever once the encrypted reference template 206 is generated.

Figure 3:
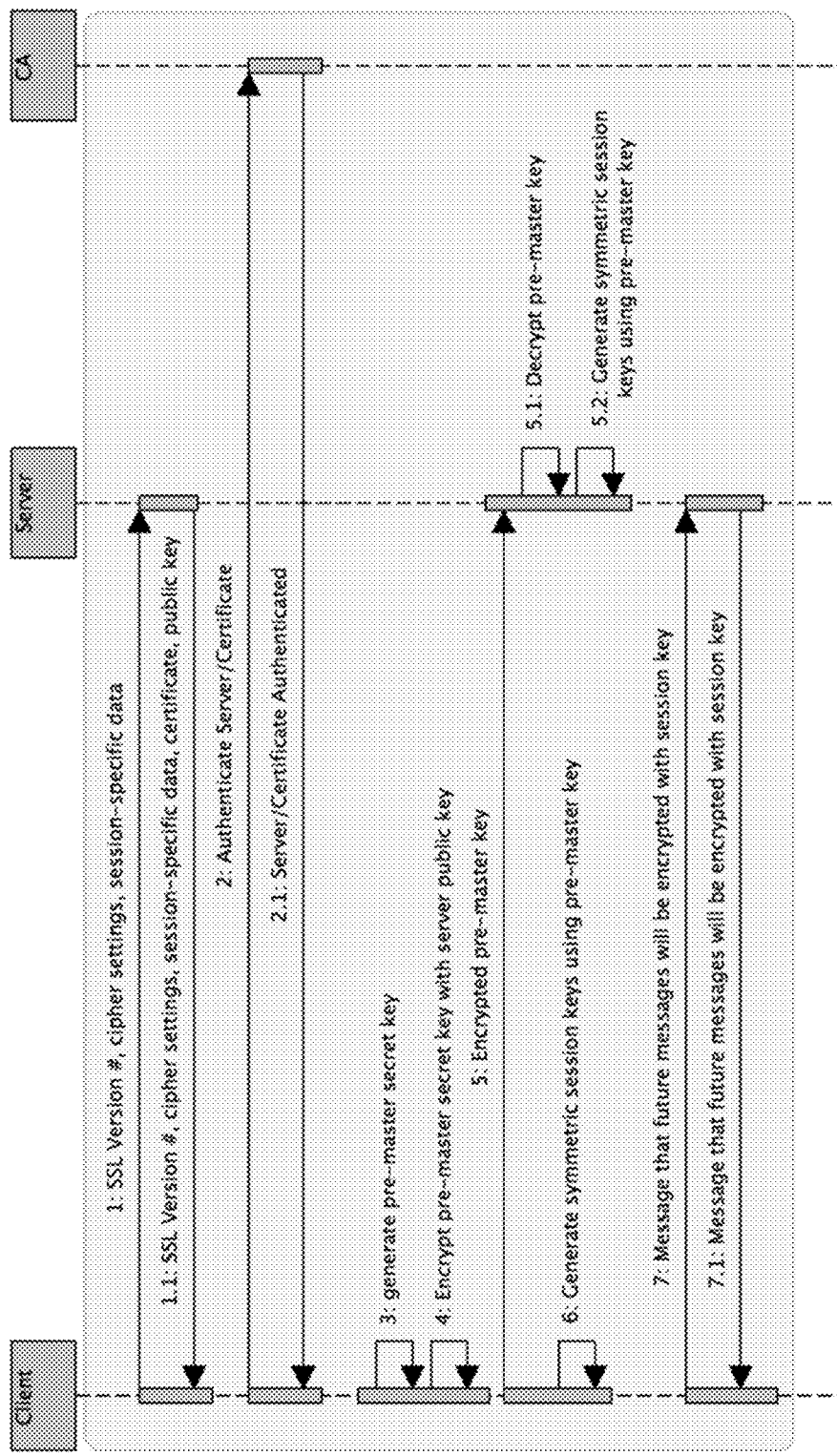
FIG. 3 is sequence diagram of client-server request/response steps to establish a Secure Sockets Layer ("SSL") for secure communication between the smart device client and the server.

As part of, for example, a log in process, the user-side client (i.e. the smart device) and the server (i.e., at the bank) use a SSL protocol between them for establishing a secure connection for transmitting private data via a communication network (such as the Internet), as illustrated in FIG. 3.

With reference to FIG. 3, an example of creating a secure connection between the client and server sides, respectively, using an SSL protocol includes:

Initially, the client wants to start an SSL session with server over port 443 (HTTPS). Client sends the server the client SSL version, cipher settings, and session-specific data if any to the server (step 1 in FIG. 3). The server responds to the client with server SSL version, cipher settings, and any session-specific data. The server also responds to the client with the server certificate which contains a public key (step 1.1 in FIG. 3).

The client authenticates the server certificate with the Certificate Authority ("CA") (step 2 in FIG. 3). The Certificate Authority replies with the authentication result (whether the certificate matches the actual server name to which it was allocated, and whether it is valid or has expired) (step 2.1 in FIG. 3).

The client generates a pre-master secret key using all the session information gathered (step 3 in FIG. 3), and then the client encrypts the pre-master key with the public key provided by the server in step 1.1 (step 4 in FIG. 3). The client then sends the encrypted pre-master key to the server (step 5 in FIG. 3), where the server decrypts the pre-master key using the server private key (step 5.1 in FIG. 3).

The server generates a symmetric session key using the pre-master key (step 5.2 in FIG. 3), and the client generates a symmetric session key using the pre-master key (step 6 in FIG. 3). The client sends a message to the server that all further messages will be encrypted through its SSL session key (step 7 in FIG. 3). The server sends the client a parallel message that all further messages will be encrypted through its SSL session key (step 7.1 in FIG. 3).

After a session encryption key on both sides is generated and confirmed (steps 5.2 and 6 in FIG. 3), the server may send an authentication request 212 to the client (i.e., to request that the user authenticate himself). The client responds back to the server as shown in FIGS. 2 and 4 (as discussed in further detail hereinbelow), including, for example, the authentication outcome and possibly (optionally) additional identifying information about the user (214 in FIG. 2 and step 3 in FIG. 4).

Figure 4:
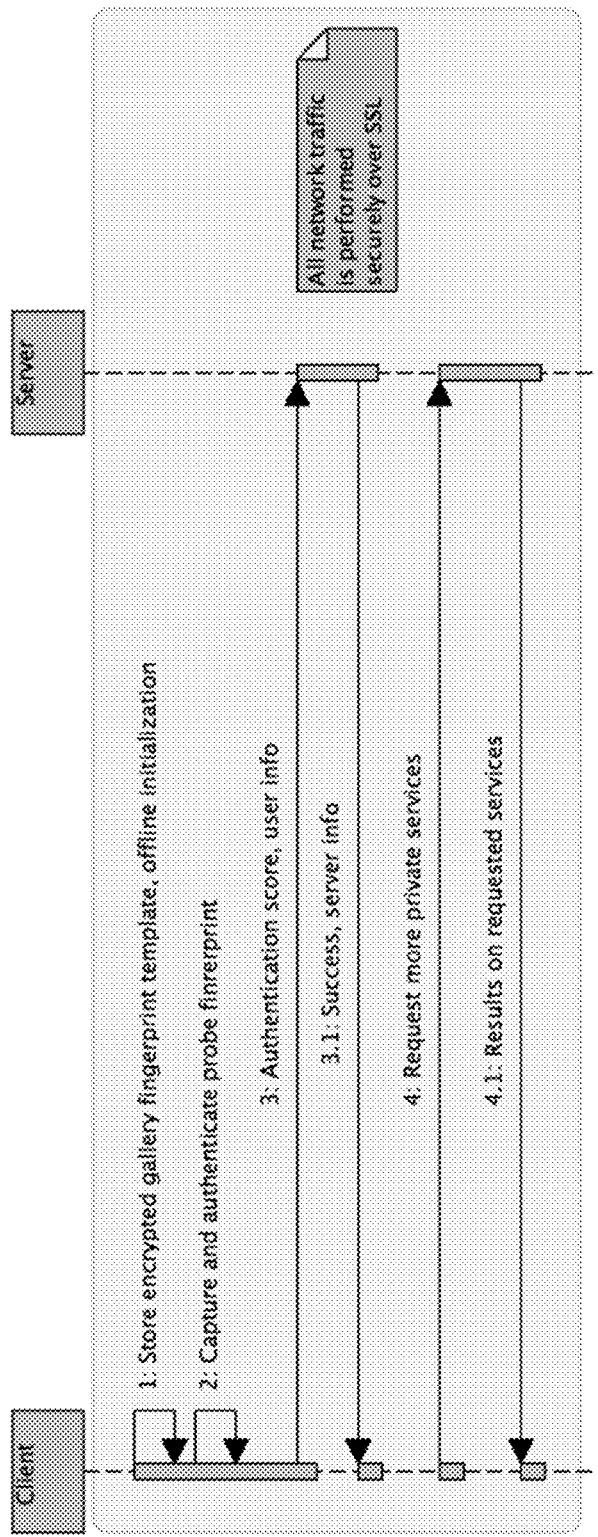
FIG. 4 is a sequence diagram illustrating secure local biometric enrollment and authentication on the client, after having established an SSL secured connection between the client and server (such as illustrated in FIG. 3).

Now with reference to FIG. 2, as well as to FIG. 4, in response to the authentication request, the user scans the appropriate fingerprint 202a using the smart device 200, an unencrypted input (or probe) template 204a is generated from the scanned fingerprint 202a using conventional methods discussed herein. Then the unencrypted input template 204a is encrypted using an internal secret key, again, such as RHEK, to obtain encrypted input template 206a. The plain original fingerprint image 202a and the unencrypted input template 204a data are then deleted forever, without possibility of recovery. The encrypted input template 206a is then compared with the encrypted reference template 206 previously stored on the smart device, and authentication is accordingly confirmed or rejected at the client. (See 214 in FIG. 2 and step 2 of FIG. 4.)

In an example of the present invention, encrypted templates are stored in an external memory of the device, whereas the internal RHEK is stored in protected internal (to the smart device 200) memory. An authentication score and selected additional private user data could be stored either encrypted in an external memory, or in clear text (unencrypted) form in protected internal memory. A given encrypted input template and resultant authentication score are deleted when the current session between the client and the server is finished.

Further with respect to FIG. 4, the client then sends the authentication score and any additional user info to the server, encrypted with the SSL session encryption keys discussed above with respect to FIG. 3 (step 3 of FIG. 4). The authentication score is compared at the server to a threshold, and if sufficient, a requested service is performed and a resulting message is returned from the server to the client (step 3.1 in FIG. 4). At that time, the client can also request additional private and/or secured services from the server, to which the server will accordingly provide such additional services and so indicate (steps 4 and 4.1 in FIG. 4).

As mentioned above, the client response 214 (user authenticated or not authenticated, along with an authentication score) is returned to the server 210, in encrypted form using the secure communication session key established between the client and the server. Also, the client response to the server may optionally include additional user information associated with or relevant to the authentication or log in process.

Once the user's identity is biometrically authenticated, the smart device 200 then can communicate further with the bank server 210 and the user U can conduct his banking business as desired.

The storage of the encrypted biometric template on the smart device is preferably secured so as to prevent tampering, for example, if the smart device stolen. One way the biometric template can be secured is to require authentication (as described above) before any alteration (replacement or erasing of) of the currently stored biometric reference template is possible. For example, if the smart device is sold or otherwise legitimately given by a first user to a new second user, the first user would have to conduct an authentication before he would be permitted to erase the reference template corresponding to himself, so that the second new user could record and store his biometric reference template. It will be appreciated that requiring authentication before any alteration of the existing biometric reference template is possible inherently requires the presence of the relevant user. In this way, a thief could not independently replace an existing reference template in a stolen phone with his own template to permit use of the smart device, without the real owner. This kind of securing of the encrypted biometric template at the smart device is also a means for assuring the party on the server side that the authentication on the client side is fully legitimate, and that no tampering has taken place.

Although the present invention is described above with reference to certain particular examples for the purpose of illustrating and explaining the invention, it must be understood that the invention is not limited solely with reference to the specific details of those examples. More particularly, the person skilled in the art will readily understand that modifications and developments can be carried out in the preferred embodiments.

What is claimed is:

1. A method of biometric authentication of a client-side authorized smart device user at least occasionally connected to a remote server via a communication network, comprising:

comparison, by the smart device, of an encrypted input biometric template corresponding to a biometric representation operably received by the smart device with an encrypted reference biometric template previously stored on the smart device and corresponding to a biometric representation of the user; and reporting by the smart device to the remote server of user authentication success/failure based on the comparison of the encrypted input biometric template and the previously stored encrypted reference biometric template, wherein previously storing the reference biometric template corresponding to a biometric representation of the user comprises: recording a biometric representation of the user on the client-side smart device; converting the biometric representation of the user into an unencrypted reference biometric template; encrypting the unencrypted reference biometric template, using a revocable hardwired encryption key, to obtain the encrypted reference biometric template; and substantially simultaneously storing the encrypted reference biometric template in a memory of the smart device and permanently deleting the recorded biometric representation of the user and the unencrypted reference biometric template.

2. The method of claim 1, wherein the biometric representation operably received by the smart device corresponds to a person to be authenticated as the authorized user corresponding to the encrypted reference biometric template stored in the smart device, wherein the method further comprises:
  reception by the smart device of the biometric representation of the person to be authenticated;
  converting the biometric representation of the person to be authenticated into an unencrypted input biometric template;
  encrypting the unencrypted input biometric template to obtain an encrypted input biometric template; and
  substantially simultaneously storing the encrypted input biometric template in a memory of the smart device and permanently deleting the recorded biometric representation of the user and the unencrypted input biometric template.

3. The method according to claim 1, wherein communication between the client-side smart device and the remote server is encrypted in both directions.

4. The method according to claim 3, wherein communication between the client-side smart device and the remote server is encrypted in both directions using an SSL secure communication protocol.

5. The method of claim 1, wherein the biometric representation of the user is recorded using a biometric representation detector either integral with or operably associated with the smart device.

6. The method according to claim 2, wherein, prior to generating a new reference biometric template corresponding to a subsequent legitimate user of the smart device, the current user of the smart device must authenticate himself in order to permit generation and retention of the new reference biometric template corresponding to the subsequent legitimate user of the smart device.

7. The method according to claim 1, wherein the biometric representation is one of fingerprints, retinal vein patterns, facial structure, iris patterns, voice prints, and palm prints.

8. A system for authenticating the identity of a smart device client user, comprising:
  a client-side smart device constructed and arranged to selectively receive a biometric representation of an authorized user of the smart device, convert the biometric representation into a reference biometric template, and encrypt the reference biometric template using a revocable hardwired encryption key in the smart device, wherein the smart device comprises or is operably associated with a biometric representation reader for detecting and inputting the biometric representation of the authorized user; and
  at least one remote server in at least occasional electronic communication with the smart device, and constructed and arranged to selectively send a request to a given smart device user to authenticate himself, and to act in response to the authentication result transmitted back from the smart device,
  wherein the smart device is further constructed and arranged to selectively receive an input biometric representation of the smart device user who is to be authenticated, convert the input biometric representation into an encrypted input biometric template, and perform an authentication comparison of the encrypted reference biometric template and the encrypted input biometric template.

9. The system according to claim 8, wherein the biometric representation is one of fingerprints, retinal vein patterns, facial structure, iris patterns, voice prints, and palm prints.

10. The system according to claim 8, wherein the smart device comprises an internal memory for storing the encrypted reference biometric template, and the smart device is further constructed and arranged to permanently delete the biometric representation and the reference biometric template substantially simultaneous to the storage of the encrypted reference biometric template.

11. The system according to claim 8, wherein the smart device is further constructed and arranged to substantially simultaneously store the encrypted input biometric template in a memory of the smart device and permanently delete the received input biometric representation and the unencrypted input biometric template.

* * * * *